_United States Patent_ [11] 3,584,961

| [72] | Inventors | Charles M. Cason, III;<br>James F. Perkins; Herbert C. Ruge, all of Huntsville, Ala. |
|---|---|---|
| [21] | Appl. No. | 789,695 |
| [22] | Filed | Jan. 8, 1969 |
| [45] | Patented | June 15, 1971 |
| [73] | Assignee | The United States of America as represented by the Secretary of the Army |

[54] DEVICE FOR MEASURING GAIN RELAXATION RATE OF A LASER
6 Claims, 4 Drawing Figs.

[52] U.S. Cl. .................................................. 356/213,
331/94.5, 356/217
[51] Int. Cl. .................................................. G01j 1/00
[50] Field of Search .................................................. 356/213,
217; 331/94.5; 250/83.6, 219 Q

[56] References Cited
UNITED STATES PATENTS
| 3,157,789 | 11/1964 | Thomas | 250/83.6 |
| 3,378,686 | 4/1968 | Langmuir | 331/94.5 X |
| 3,454,777 | 7/1969 | Marcus | 250/219 QX |

OTHER REFERENCES

Freiberg, R. J. et al. " Effects of Lasering Upon the Electronic Gas and Excited-State Populations in Xenon Discharges." JOURNAL OF APPLIED PHYSICS. Vol. 38 No. 1, January 1967. pp. 250— 262.

Primary Examiner—Ronald L. Wibert
Assistant Examiner—T. Major
Attorneys—Harry M. Saragovitz, Edward J. Kelly, Herbert Berl and Harold W. Hilton ABSTRACT: A method for measuring the gain relaxation rate of a laser. A laser cavity is periodically interrupted by a rotating chopper wheel to induce loss modulation. A slow response detector measures the modulated laser output and feeds the indication thereof to a chart recorder. The frequency of modulation or chopper wheel rate is simultaneously fed to the recorder. A curve is taken of the laser output power compared to the frequency of laser modulation. Fitting the power data curve to a curve determined theoretically for relative efficiency yields a gain relaxation rate that is unique to the particular laser and optical cavity.

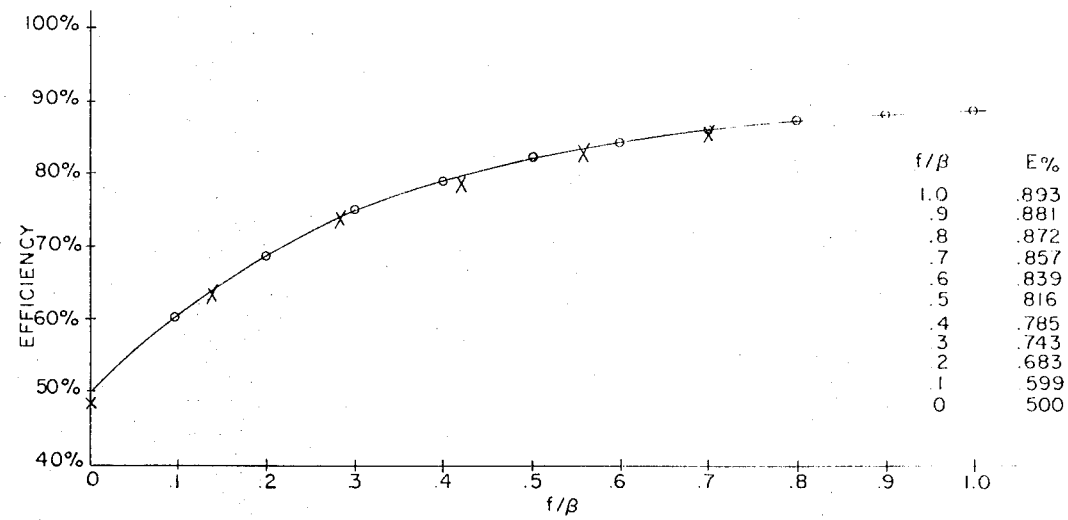
FIG. 2
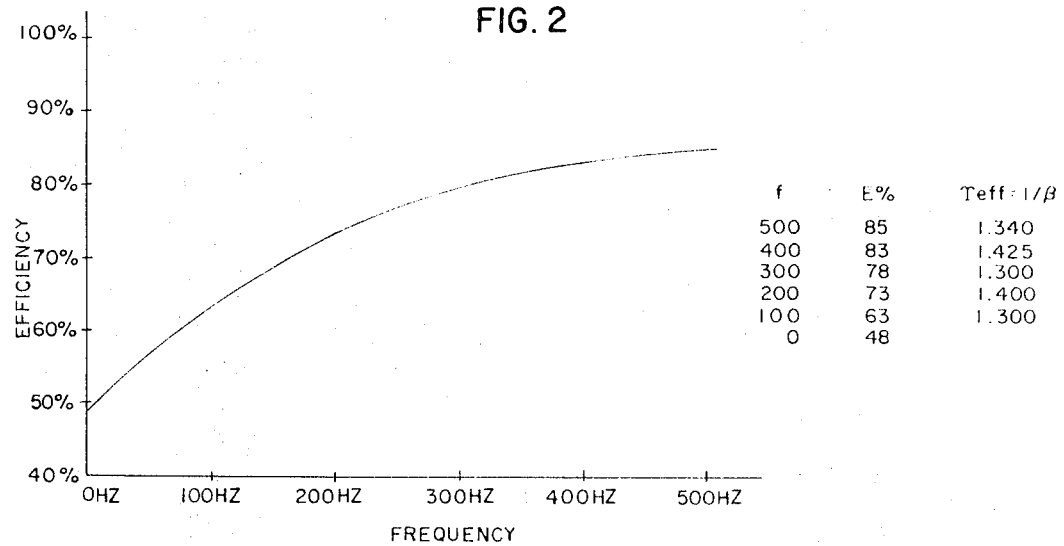
FIG. 3
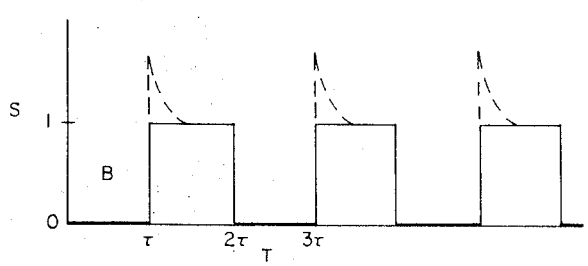
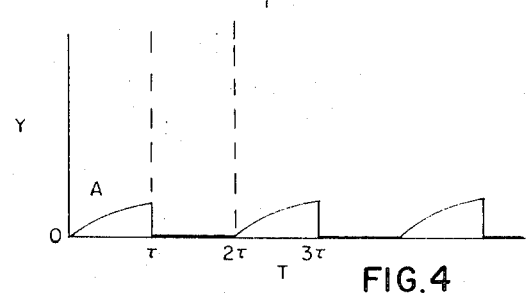
FIG. 4
Charles M. Cason III
James F. Perkins
Herbert C. Ruge,
INVENTORS.

DEVICE FOR MEASURING GAIN RELAXATION RATE OF A LASER

BACKGROUND OF the INVENTION

Various loss-modulation techniques for studying the processes taking place inside the discharge tube of gas lasers have been reported in the literature. For example, several researchers have utilized a phase-lock technique to study the interaction of a chopper wheel modulated laser beam with the lasing discharge of gas lasers. Others have studied the carbon dioxide laser plasma and various molecular relaxation processes by means of pulsed and Q-switching techniques. In all of these techniques attention is given to measuring the output variables and physical observable properties.

These and other prior art methods utilize devices which in some manner determines the lifetime of an excited state of atoms or molecules. These devices require a detector which has a response time much faster than the lifetimes being measured.

SUMMARY OF THE INVENTION

The apparatus of the present invention is a method for measuring the gain relaxation rate of a laser. This method requires a slow response detector or a filter system to measure average signal level. A laser cavity is periodically interrupted to induce loss modulation. Modulated laser output power is detected and fed to a recorder simultaneously with a pulse repetition rate or reference frequency of modulation. The recorded output is related to the average laser output power. A comparison of the recorded data with a theoretical curve yields a gain relaxation rate that is unique to the laser.

An object of the present invention is to provide a method for measuring gain relaxation rate and that requires only a slow response time detector.

Another object of the present invention is to provide an economical means for measuring long wavelength outputs of lasers.

BRIEF DESCRIPTION OF THE DRAWINGS

FIG. 2 is a theoretical output power curve.
FIG. 3 is an actual output power curve.
FIG. 4 is a graph of laser output pulses compared to laser population levels.

DESCRIPTION OF THE PREFERRED EMBODIMENT

Figure 1:
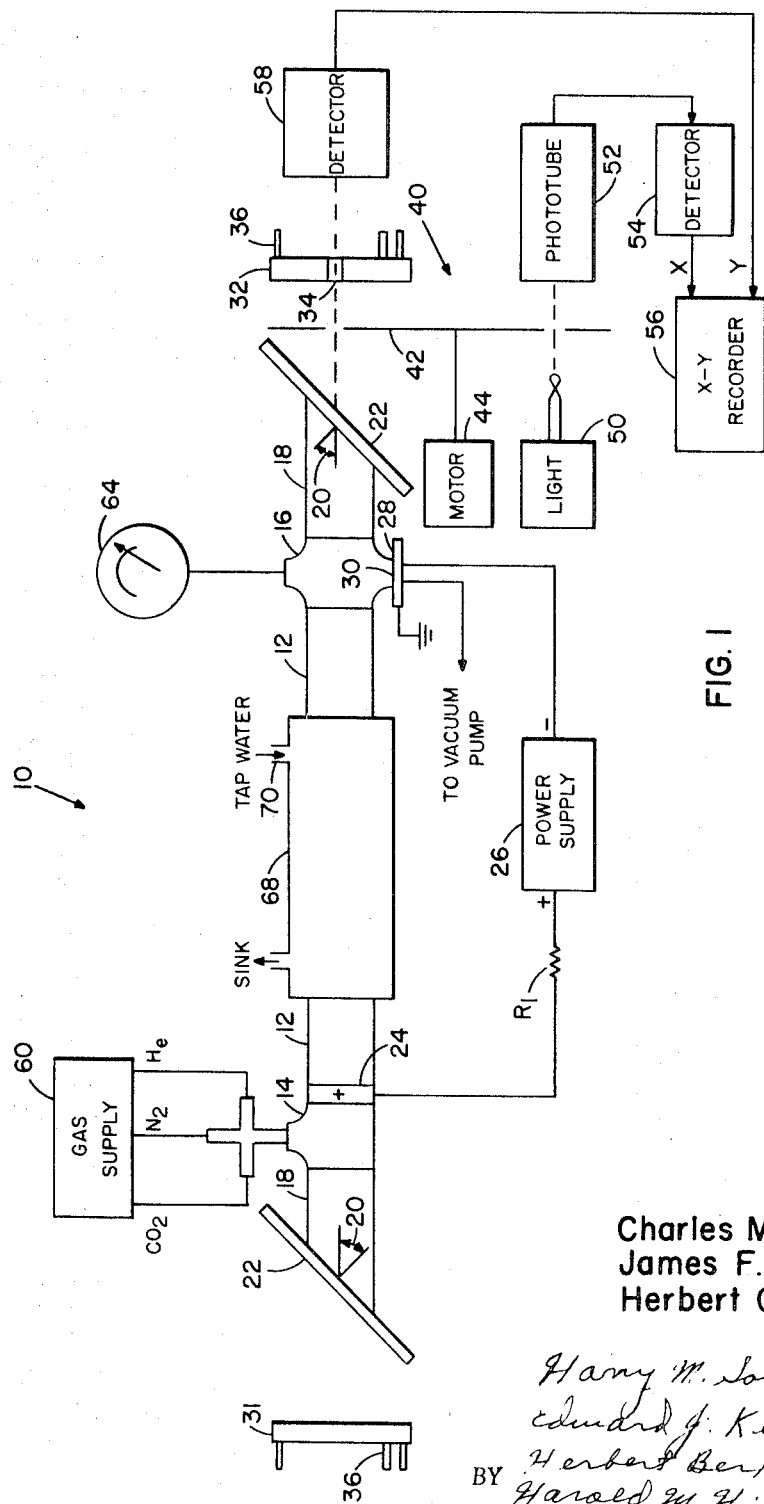
FIG. 1 is a circuit diagram of a laser and auxiliary equipment.

In determining the gain relaxation rate of a laser, the output power from a typical model is measured and compared with the frequency of modulation of the output signal. A simple model is based on the following assumptions:

1. A steady electric discharge makes a time-independent contribution to the excess population (inversion) of upper laser level.
2. Two processes contribute to reduction of the excess population of upper laser level. These are alpha (a) and beta (b), respectively;
    a. Stimulated emission—emission that is assumed to proceed extremely rapid so that there is essentially equal population of upper and lower laser levels when the device is lasing and
    b. Lumped effect of all other processes, including spontaneous emission and collisional effects. For simplicity it is assumed that this lumped effect contributes a rate which is proportional to the instantaneous population excess.

A rotating sector disc called a chopper wheel is operated to interrupt laser oscillations, thereby providing "open" and "closed" periods of modulation. Considering the case where the "open" period equals the "closed" period, the teeth of the chopper wheel have the same angular size as the opening between teeth.

Using $y$ as a parameter proportional to population excess, the differential equation for $y$ is $$(dy/dt) = C - S(t)\alpha y - By. \quad (1)$$

Here $\alpha$ is the very large rate associated with stimulated emission, while $B$ is the smaller rate corresponding to other processes. By assumption we may neglect $B$ relative to $\alpha \cdot C$ is a constant. $S(t)$ is unity when the wheel is open, and zero when it is closed. During the period when the wheel is open, there is a contribution of amount $CY$ to the population excess, $Y$ being the time period the chopper wheel is open or closed. This is assumed to be completely given up to lasing. During the period when the wheel is closed, there is also a contribution of amount $CY$ to the population excess. However, some of this excess decays away due to the term involving $B$, and only the portion which is not so depleted is available for production of a sharp, intense spike of laser output at the instant when the wheel next opens. Thus the contribution to laser output resulting from the wheel-closed interval, is not $CY$ but is instead given by the solution of $$(dy/dt) = C - aBy \quad (2)$$

subject to the condition that $y(0) = 0$, which is simply $$y = C/B (1 - e^{Bt}) \quad (3)$$

and for $Bt \ll 1$ $$y \approx Ct. \quad (4)$$

Relative efficiency ($E$) is defined as the ratio of the number of lasing transitions at a given angular rate for the chopping wheel to the maximum possible number of transitions. The maximum number corresponds to a very rapid angular rate, such that the population excess always remains so small that losses due to processes other than stimulated emission are negligible. The equation for relative efficiency is $$E = \tfrac{1}{2} + \tfrac{1}{2} \frac{\dfrac{C}{B}(1 - e^{-BT})}{CT} \quad (5)$$

and $$E = \tfrac{1}{2} + (1/2BY)(1 - e^{1BY}) \quad (6)$$

The first term in the above expression for efficiency comes from the period during which the wheel is open (assumed to be half the total time), while the second term involves the ratio of the actual population excess at the time of wheel opening to the excess which would occur in absence of losses other than stimulated emission. The term $1/2Y$ is defined as being equal to the frequency ($f$) or chopper wheel angular rate. Therefore $1/2BY$ is equal to $f/B$.

For $BY \gg 1$, equation (5) becomes simply $$E = \tfrac{1}{2} + \tfrac{1}{2} \, 1/BY. \quad (7)$$

FIG. 2 discloses a curve of equation (6) where efficiency is plotted against $(12BY) = f/B$. The term $f/B$ is plotted for values between 0 and 1 and efficiency is solved for. The circles on the curve represent calculated point. The ($X$) marks indicate the relationship between equivalent points on the dynamic curve of FIG. 3 to the theoretical curve, and will be explained in more detail subsequently. By fitting eq. (6) to experimental data an estimate is obtained of the effective rate of reduction of excess population due to effects other than stimulated emission. This estimate provides a representative value of a lumped parameter describing the rate. The rate must be calculated individually for each laser due to the particular characteristics of the laser.

Referring now to the drawings wherein like numerals represent like parts in all figures, and wherein there is disclosed a preferred embodiment of the present invention. A laser device 10 includes a laser optical cavity as disclosed in FIG. 1. A laser discharge tube 12, constructed from a 10-foot section of 2-inch diameter Corning glass tubing material, has a tee section 14 and a cross 16 of the same material attached to the ends thereof two sections of aluminum pipe 18 cut at the Brewster angle 20 for sodium chloride on one end thereof have the other ends respectively connected to the tee and cross. A sodium chloride rectangular window 22 or plot is mounted at the Brewster angle to aluminum pipes 18. The rectangular flats 22 are 0.75×35-inches and serve as end windows for the tube assembly. A brass ring 24 is located at a junction of discharge tube 12 and tee 14 to form a positive electrode for power supply 26. A negative electrode 28 consists of a brass ring with a copper screen over an aperture 30 of glass cross 16. This negative electrode is also at system ground. The effective distance between electrode 24 and 28 for the particular embodiment is 10.5 feet.

A pair of 4-inch diameter, gold-coated flat mirrors 31 and 32 are mounted external to opposite ends of the discharge tube. Distance between mirrors 31 and 32 is approximately 13 feet. The reflectivity of the mirrors is approximately 99 percent and they are finished to a flatness of one-fiftieth of a wavelength. The output mirror 32 has a 1.2 inch diameter hole 34 in its center for coupling out the laser energy. The mirror mounts (not shown) are equipped with three micrometer adjustments 36 to provide translational movement and horizontal and vertical tilt. A rotating sector disc or chopper wheel assembly 40 is located near the output end of the laser and within the laser cavity such that a notched wheel 42 can interrupt the laser beam in the space between NaCl flat 22 and mirror 32. Wheel 42 is rotated by a synchronous motor 44. A light source 50 is mounted diametrically opposite the laser beam with respect to wheel 42 so that wheel 42 will interrupt a light beam therefrom simultaneously with the interruption of the laser beam. A phototube 52 is aligned with light source 50 and responds to the interrupted beam therefrom to feed a signal to a detector 54. Detector 54 has an output connected to an input of an x–y recorder 56. A detector 58 in alignment with hole 34 of mirror 32 is responsive to the laser output to provide a signal to the x–y recorder.

In the preferred embodiment, though not limited thereto, a nitrogen gas ($N_2$), carbon dioxide ($CO_2$), and helium (He) system is employed for laser action. A gas supply 60 is fitted with regulator valves and pressure gauges to indicate and control gas flow. Gases are supplied through separate lines to tee 14. A vacuum pump (not shown) is connected to cross 16 and a pressure meter 64 connected to cross 16 indicates the pressure of the discharge tube 12. A cooling jacket 68 incloses a portion of tube 12 and tap water is supplied at port 70 to maintain temperature control.

In the $N_2$-$CO_2$-He system, laser action takes place between vibrational-rotational levels of the electronic ground state of the $CO_2$ molecule. Carbon dioxide is a linear, symmetric, triatomic molecule with the carbon atom balanced against two oxygen atoms. It has three normal modes of vibration: the symmetric mode where the two oxygen atoms vibrate against each other along the molecular axis; the doubly degenerate bending mode where the oxygen atoms vibrate transverse to the molecular axis; and the asymmetric mode where the two oxygen atoms vibrate in the same direction with each other along the molecular axis. Each of these normal modes is considered to be a harmonic oscillator approximately independent of the others. The addition of helium to the $N_2$-$CO_2$ laser system increases the output power by at least a factor of four.

In operation the laser is pumped by power source 26 and is operated at low power until it stabilizes, chopper wheel 40 is brought up to the desired maximum frequency, input power is brought up to the desired level, and the frequency is then swept to zero and the data curve is simultaneously recorded. With the laser power input at the desired level the chopper is periodically closing and opening the path to mirror 32. When wheel 42 is open for the laser beam to pass, it is also open for lamp 50 to activate photocell 52. A portion of the laser energy power passes through opening 34 to impinge upon detector 58 and a portion is reflected back (feedback) into the laser by mirror 32. Detector 58 may be a thermocouple or thermopile, such as a Gardon Gauge, and responds to the incident radiation by transmitting an electrical signal to the y axis of recorder 56. The output of detector 58 is related to the average laser output power. Simultaneously with detector 58, photocell 52 responds to light 50 to generate a square wave at the same frequency that the laser oscillation is chopped. This frequency signal is converted into a proportional analog signal by detector 54, which may be converter, and fed to the recorder x-axis.

At chopping rates near or more than the reciprocal laser lifetimes the x-axis of recorder 56 is calibrated to give a full scale reading. Frequency is then swept to zero by motor 44, giving rise to a curve as shown in FIG. 3. The curve being recorded from right to left as frequency decreased.

In FIG. 4, two curves are shown. Curve A indicates the excess population of the laser. Curve B indicates the output power pulse as applied to detector 58. A fast detector would have sensed the ghost spikes shown in curve B. A slow detector 58 senses the average output power for the period. The chopper wheel 42 is closed during the period from 0 to Y, 2Y to 3Y, and etc., which is indicated by a buildup in excess population with laser 10. When the chopper wheel is open this level is sensed by detector 58 which produces the output pulses of curve B.

The theoretical data curve (FIG. 2) taken from equation (6) is fitted to or compared with the experimental data curve of FIG. 3 to solve for the gain relaxation rate of the laser. This gain relaxation rate may be referred to as $Y_{eff}$ and can be described as the effective time for recovery to the steady-state population inversion following a laser pulse. $Y_{eff}$ is a different value for each individual laser and optical cavity. However, $Y_{eff}$ for duplicates of a given laser is the same for all duplicates. The theoretical data or mathematical model and the parameter $Y_{eff}$ provide information that is effective in the design of laser devices for particular applications.

In recording FIG. 3, frequency is swept from 500 hertz to 0. Several frequencies are singled out on the graph and the percentage efficiency associated therewith is noted on the curve. Efficiency being the same on the curves of both figures, it is obvious to compare a value for $f/B$ with frequency. For example, the corresponding value of efficiency for a frequency of 200 Hz. is 73 percent. The corresponding value of $f/B$ for an efficiency of 73 percent is 0.28. If the theoretical value for $f/B$ is then divided by the corresponding frequency, the gain relaxation time $Y_{eff}$ is acquired, and for the example chosen it is 1.4 milliseconds. Averaging several values of the gain relaxation rate for various frequencies provides a more accurate figure.

The $(x)$ marks on the curve of FIG. 2 show the correlation of the six selected frequencies of the dynamic curve with the theoretical curve. Correlation is obtained by multiplying $Y_{eff}$ by any frequency to generate $f/B$, and then plotting this $f/B$ as a function of efficiency. The values obtained for $f/B$, and when plotted on the theoretical curve will fall on the curve or in close proximity thereto.

Although a particular embodiment and form of this invention have been illustrated, it is obvious to those skilled in the art that modifications may be made without departing from the scope and spirit of the foregoing disclosure. For example, with a solid state laser, such as a ruby laser, a Kerr cell or a Faraday rotator may be used as the shutter for the laser output. Therefore, it is understood that the invention is limited only by the claims appended hereto.

We claim:

1. In obtaining the gain relaxation rate of a laser, apparatus comprising in combination: a laser having an output pulse repetition rate; measuring means synchronous with said laser output for determining the pulse repetition rate of said laser; power output measuring means responsive to the output of said laser; and recording means responsive to said power input measuring means and said pulse rate measuring means for recording a graph of said power output versus said pulse repetition rate.

2. The invention as set forth in claim 1 wherein said laser system includes a laser discharge tube having a bevel angle at each end thereof; first and second reflective means at each end of said laser discharge tube and coaxially aligned therewith; and interrupting means disposed between said first reflective means and said tube for intermittently interrupting the cavity oscillation of said laser at a decreasing rate.

3. The invention as set forth in claim 2 wherein said power output measuring means is a detector coaxially aligned with said first reflective means and having an output connected to said recording mean; said pulse repetition measuring means includes a light source diametrically opposite said laser discharge tube, a photocell coaxially aligned with said light source and responsive thereto to provide an output signal to said recording means; and said interrupting means is further disposed between said light source and said photocell for synchronizing the pulse repetition rate measuring means with the power output of said laser.

4. The invention as set forth in claim 3 wherein said laser device is a gas laser having a sodium chloride window over each beveled edge, said beveled edge being cut at the Brewster angle for sodium chloride; said reflective means being fully reflective mirrors and said first mirror having a circular hole in the center thereof for passing a beam from said laser therethrough to impinge upon said detector; said detector being a thermocouple or thermopile; and said interrupting means is a motor driven, rotating sector disc or chopper wheel that simultaneously opens and closes to pass or block the laser beam and a beam from said light source.

5. A method for measuring the gain relaxation rate of a laser having a discharge tube provided with end reflective members forming a laser cavity therebetween and a chopper wheel intermediate said end reflective members said method comprising the steps of: pumping a laser to provide a specific power output level; sensing the average power output of said laser; intermittently interrupting said power output at a decreasing rate; measuring the rate of interruption of said power output; recording a graph of said average power versus said rate of interruption; and determining said gain relaxation rate whereby said relaxation rate is defined by the ratio of $f/B$ to said rate of interruption, where $f=$ the angular rate of said chopper wheel and $B =$ the rate of instantaneous population excess of said laser.

6. A method for measuring the gain relaxation rate of a laser as set forth in claim 5 and further comprising the step of: sweeping a chopper wheel uniformly from a fixed frequency to zero within the laser cavity adjacent the output end of said laser to loss modulate the laser gain and to intermittently interrupt said power output.